United States Patent [19]

Takahashi

[11] Patent Number: 5,436,845
[45] Date of Patent: Jul. 25, 1995

[54] AUTOMATIC PROGRAMMING APPARATUS FOR PLURAL-SPINDLE NUMERICALLY CONTROLLED MACHINE

[75] Inventor: Yoshikatsu Takahashi, Aichi, Japan
[73] Assignee: Mitsubishi Denki Kabushiki Kaisha, Tokyo, Japan
[21] Appl. No.: 361,696
[22] Filed: Dec. 22, 1994

Related U.S. Application Data

[63] Continuation of Ser. No. 73,466, Jun. 9, 1993, abandoned, which is a continuation of Ser. No. 652,750, Feb. 8, 1991, Pat. No. 5,243,534.

[30] Foreign Application Priority Data

Feb. 9, 1990 [JP] Japan .................................. 2-28472

[51] Int. Cl.⁶ ...................... G06F 19/00; G05B 19/18
[52] U.S. Cl. .................... 364/474.21; 82/118; 82/129; 364/474.02; 364/474.11; 364/474.36; 483/4; 483/14
[58] Field of Search ............ 364/474.21, 474.02, 364/474.11, 474.36; 82/118, 119, 120, 121, 124, 129; 318/567, 569; 29/563, 38 B, 27 R, 27 C; 483/4–11, 14, 15

[56] References Cited

U.S. PATENT DOCUMENTS

| | | |
|---|---|---|
| 3,739,157 | 6/1973 | Bobrowicz et al. ............ 364/474.23 |
| 4,631,684 | 12/1986 | Akasofu ...................... 364/474.11 X |
| 4,692,856 | 9/1987 | Komiya ........................... 364/474.11 |
| 4,979,121 | 12/1990 | Inoue et al. ..................... 364/474.36 |
| 4,982,634 | 1/1991 | Nagel et al. ........................ 29/563 X |
| 5,058,029 | 10/1991 | Uemura ....................... 364/474.11 X |
| 5,088,361 | 2/1992 | Kouima et al. .................... 29/563 X |

FOREIGN PATENT DOCUMENTS

| | | |
|---|---|---|
| 0203452 | 12/1986 | European Pat. Off. . |
| 0267288 | 5/1988 | European Pat. Off. . |
| 0328392 | 8/1989 | European Pat. Off. . |
| 0335659 | 10/1989 | European Pat. Off. . |
| 2206516 | 1/1989 | United Kingdom . |

Primary Examiner—Joseph Ruggiero
Attorney, Agent, or Firm—Sughrue, Mion, Zinn, Macpeak & Seas; Richard C. Turner; Peter A. McKenna

[57] ABSTRACT

An automatic programming system is provided for a lathe which has more than one spindle. The system has one program which controls the machining processes which are performed using the spindles. The same program also controls a process which transfers a workpiece between the spindles. Additionally, the programming system is able to relocate the origin of a coordinate system used as a reference for the machining based on data relating to the length of the workpiece and the distance between the chucks of the spindles.

3 Claims, 14 Drawing Sheets

FIG. 3

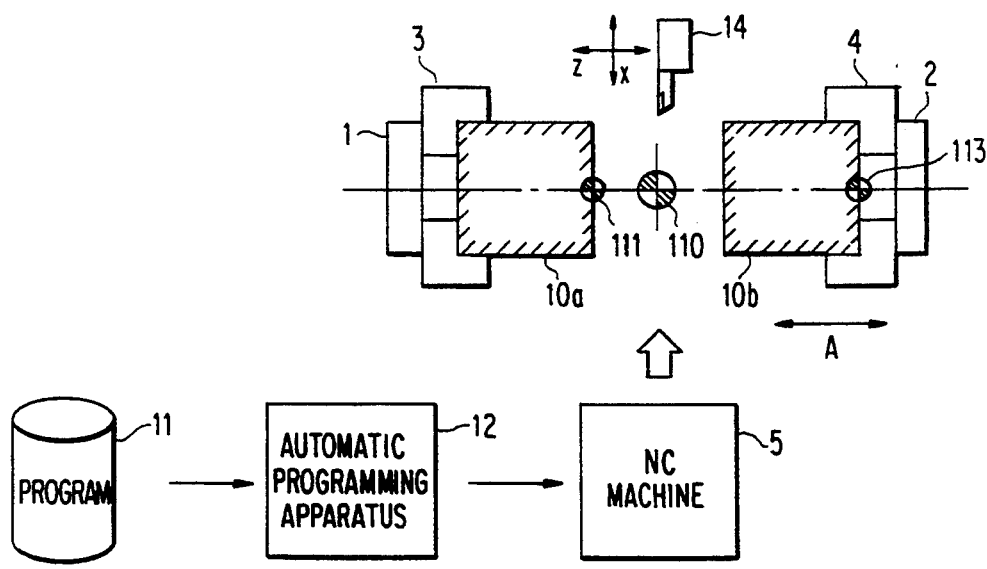

FIG. 4

| SOURCE PROGRAM | HEAD 1 PROGRAM | | HEAD 2 PROGRAM |
|---|---|---|---|
| COMMON | COMMON | | COMMON |
| SEP-INDEPENDENT 1 | SEP-INDEPENDENT 1 | | SEP-INDEPENDENT 1 |
| MACHINING BY HEAD 1 | MACHINING BY HEAD 1 | | |
| TRS-CHK | TRS-CHK | - WAITING - | TRS-CHK |
| SEP-INDEPENDENT 2 | SEP-INDEPENDENT 2 | | SEP-INDEPENDENT 2 |
| MACHINING BY HEAD 2 | | | MACHINING BY HEAD 2 |
| SEP-INTERLOCKING | SEP-INTERLOCKING | - WAITING - | SEP-INTERLOCKING |
| MACHINING BY HEAD 2 | | | MACHINING BY HEAD 2 |
| END ~11S | END ~11A | | END ~11B |

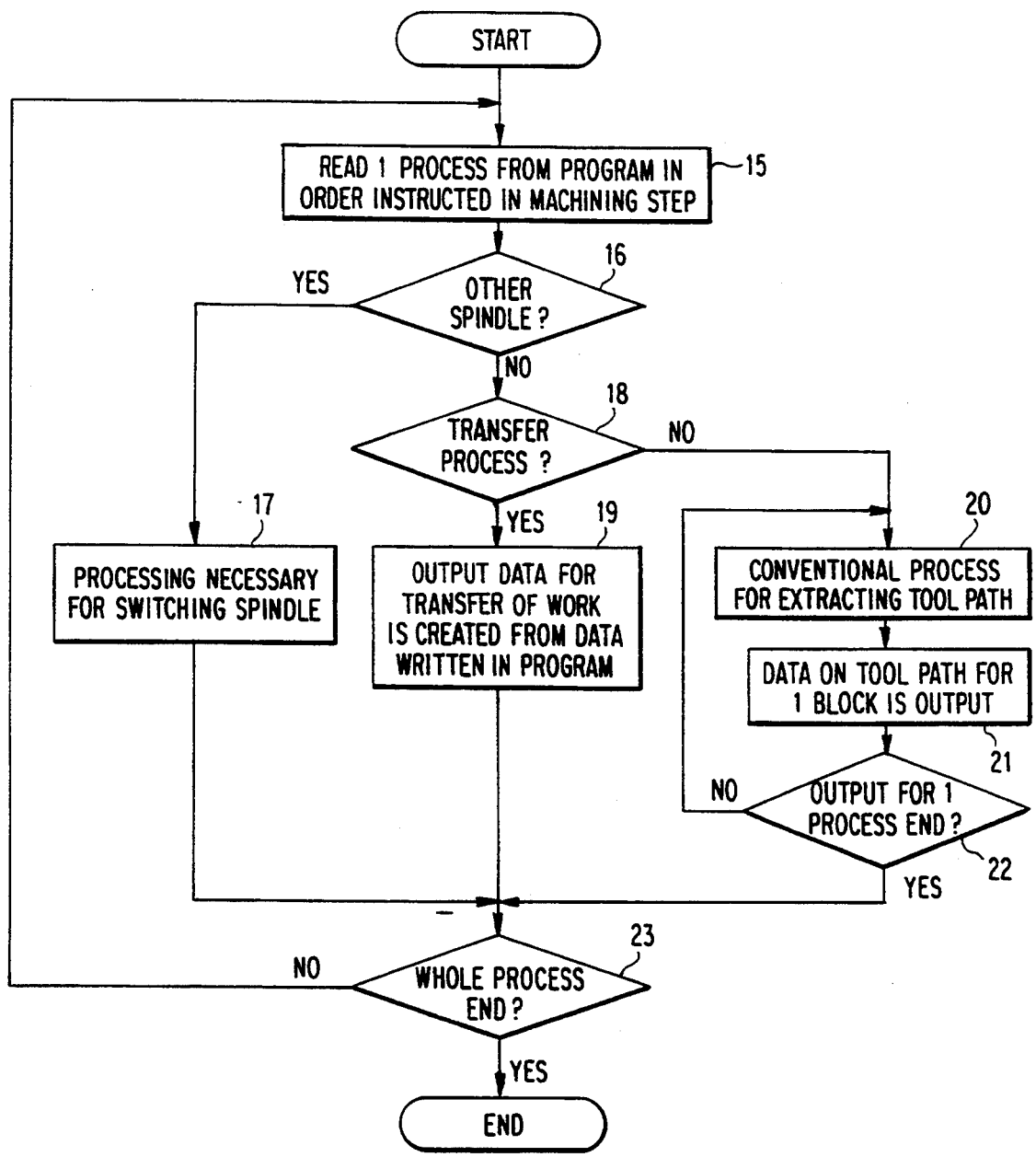

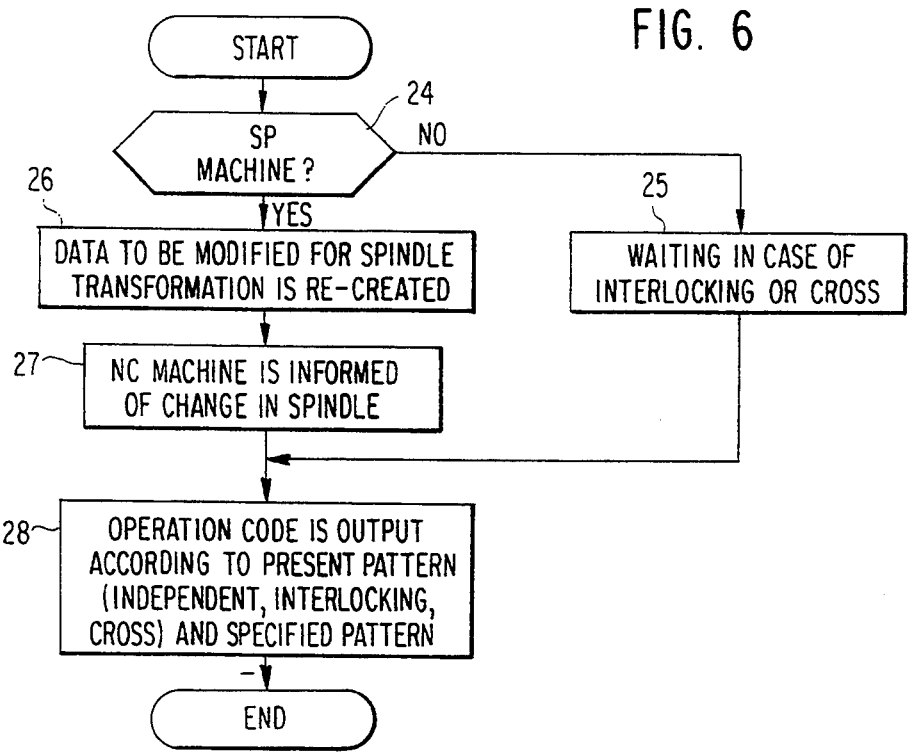

P NO. 99  MODE SEP-INTERLOCKING  HEAD 1  SPINDLE ◇
         31        32              35   : NUMBER GIVEN TO HEAD USED MAINLY IS SPECIFIED

INTERLOCKING : SPECIFIED HEAD MOVES MAINLY; Z AXIS INTERLOCKS

P NO. 99  MODE SEP-CROSS  HEAD 1  SPINDLE 0 ~36
         31      33        35     0 : SPINDLES OF HEADS 1 AND 2 ARE SYNCRONIZED
                                  1 : ONLY SPECIFIED HEAD IS DRIVEN; OTHER IS STOPPED
                                  : NUMBER GIVEN TO HEAD USED MAINLY IS SPECIFIED

CROSS : WORK IS MACHINED BETWEEN Z AXIS OF SPECIFIED HEAD AND X AXIS OF UNSPECIFIED HEAD

P NO. 99  MODE SEP-INDEPENDENT  HEAD 1  SPINDLE ◇
         31        34            35   : NUMBER GIVEN TO HEAD EXECUTING SUBSEQUENT PROCESS

INDEPENDENT : DECLARE EXECUTING HEAD

| PRESENT MODE | SPECIFIED MODE | OUTPUT M CODES | |
|---|---|---|---|
| SEP-INDEPENDENT | SEP-INTERLOCKING | M511 | ~37 |
| SEP-INDEPENDENT | SEP-CROSS | M544 | ~38 |
| SEP-INTERLOCKING | SEP-INDEPENDENT | M512 | ~39 |
| SEP-INTERLOCKING | SEP-CROSS | M544 | ~40 |
| SEP-CROSS | SEP-INEPENDENT | M545 | ~41 |
| SEP-CROSS | SEP-INTERLOCKING | M511 | ~42 |

FIG. 12

```
         MODE      PREPARATION
P NO.    PATTERN   NUMBER        HEAD    SPINDLE  PUSH  CHUCK
99       TRS-CHK   8             1-2     1        1     ◆
         /  \      |             |       |        |
        77   78    79            80      81       82
```

0 : NO PUSH
                                                      1 : PUSH

0 : KEEP OR STOP
                                            OPERATION OF SPINDLE
                                      1 : FORWARD ROTATION
                                      2 : REVERSE ROTATION
                                      3 : ORIENTATION
                                      4 : POSITIONING OF C AXIS

1 : 1   2 : FROM HEAD 1 TO 2
                     2 : 2   1 : FROM HEAD 2 TO 1

◆ : DATA IS REGISTERED IN PREPARATION IMAGE ON SCREEN

: TRANSFER BY MEANS OF CHUCK WORK

FIG. 13

```
         MODE      PREPARATION
P NO.    PATTERN   NUMBER        HEAD    SPINDLE  PUSH  CHUCK
99       TRS-BAR   8             1       2        ◆     1
         /  \      |             |       |              |
        77   83    79            84      81             85
```

0 : OPEN CHUCK
                                                       1 : CLOSE CHUCK

0 : KEEP OR STOP
                                    OPERATION OF SPINDLE
                             1 : FORWARD ROTATION
                             2 : REVERSE ROTATION
                             3 : ORIENTATION
                             4 : POSITIONING OF C AXIS

1 : CHANGE IN POSITION OF HEAD 1
                 2 : CHANGE IN POSITION OF HEAD 2

◆ : DATA IS REGISTERED IN PREPARATION IMAGE ON SCREEN

: CHANGE IN POSITION AT WHICH WORK IS GRIPPED

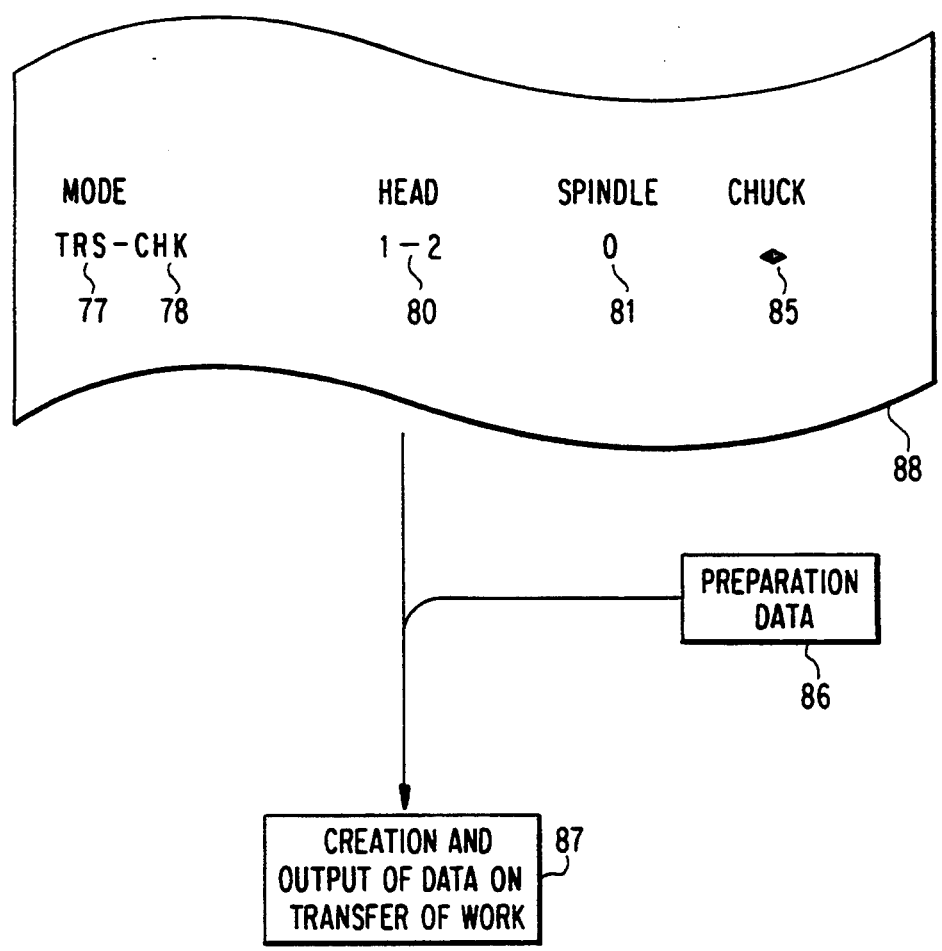

AUTOMATIC PROGRAMMING APPARATUS FOR PLURAL-SPINDLE NUMERICALLY CONTROLLED MACHINE

This is a Continuation of Application Ser. No. 08/073,466 filed Jun. 9, 1993, which is a continuation of Application Ser. No. 07/652,750 filed Feb. 8, 1991, now abandoned, now U.S. Pat. No. 5,243,534.

BACKGROUND OF INVENTION

The present invention relates to an automatic programming apparatus which is used with a numerically controlled machine having plural spindles. The machine is loaded with a program that permits a work to be machined using two spindles and to be transferred between the two spindles. The automatic programming apparatus is part of a numerically controlled machine tool designed to be loaded with a program which expresses the machined shape of the work and the movement of the tool. When such a program is loaded into a CPU, the CPU automatically calculates the path to be followed by the tool and delivers control media to the NC machine.

PRIOR ART TECHNIQUES

FIG. 19 shows the structure of the machining control portion of the lathe disclosed in Japanese Kokai 169811/1982, the lathe having two spindles. Shown are spindles 1, 2, of heads 1, 2; automatic chucks 3, 4; workpieces 10a, 10b gripped by the chucks 3, 4, respectively, and a numerically controlled (NC) machine 5. The works 10a and 10b are machined under the control of the NC machine 5, at heads 1 and 2, respectively. Programs 101 and 102 are prepared to cause the spindles 1 and 2 to machine the workpieces, respectively, one program for each head. Transfer programs 103 and 104 are also prepared, for the purpose of transferring a work between the two spindles. An automatic programming apparatus 8 calls accesses the programs 101 and 102 as necessary for machining and analyzes them. The programming apparatus delivers control instructions corresponding to the result of the analysis to the NC machine 5. An EIA program analysis portion 9 calls and analyzes the programs 103 and 104 as necessary when a work is to be transferred. The analysis portion 9 delivers control instructions corresponding to the result of the analysis to the NC machine 5.

FIG. 20 is a flowchart illustrating the prior art method of processing a work using the two spindles. FIG. 21 shows the manner in which a work is machined by the head 1. FIG. 22 shows the manner in which the work is machined by the head 2. FIG. 23 is a flowchart illustrating the prior art manner in which a work is transferred. FIG. 24 shows an EIA program for an NC machine, used for transferring a work from one spindle to another. The EIA program is not an automatic program. FIGS. 25(a)-25(c) are diagrams showing the operation of transferring a work in accordance with the EIA program.

In these figures, the origin, or home position, for the machine is indicated by 100. The position of a reference work origin 110 is determined from the origin 100 of the machine, using parameters. Whenever a new automatic program is loaded, the origins of works 111 and 112 are determined. Tools are indicated by 6 and 7.

Operation will now be described.

The prior art method of machining a work using two spindles is first described, referring to the flowchart of FIG. 20.

First, the NC machine 5 activates the automatic programming apparatus 8, which makes a decision as to which of the heads should be used for the current machining process (step 121). If head 1 is to be used, program 101 is called to cause head 1 to machine the work (step 122). A tool path is selected according to the program 101, and instructions are given to the NC machine 5. As a result, the work is machined by head 1, as shown in FIG. 21 (step 123). When the work is to be machined by head 2, program 102 is called for this machining process (step 124). A tool path is extracted, and head 2 is made to machine the work (FIG. 22) (step 125). These steps are carried out until the machining process ends (step 126).

The manner in which a work is transferred between spindles 1 and 2 is next described by referring to the flowchart of FIG. 23.

When work 10 must be transferred from one spindle to another, e.g., for machining on both spindles during the machining process (step 127), a check is performed to see whether an EIA program 103 (for transfer from head 1 to head 2) or 104 (for transfer from head 2 to head 1) exists (step 128). As mentioned above, the transfer process cannot be accomplished via automatic programming, so resort must be had to an EIA program. If no EIA program exists, the work must be transferred manually (step 129). If program 103 (or 104) exists, the program corresponding to the required transfer is called (step 130). The program is executed at step 131.

When the transfer is completed, either program 101 or 102 is called (depending on the head at which the work is now located) to further machine the work (step 132). The called program is run and the work is machined (step 133). These steps are performed until the machining process ends (step 135). If the result of the decision made in step 127 is that transfer is not needed, then the work is machined on one spindle (step 134).

An EIA transfer program example is shown in FIG. 24 and is indicated by 200. The work is transferred from head 1 to head 2 using this program. The operation will be described referring to FIG. 25.

When machining using spindle 1 (head 1) is finished (FIG. 25(a)), tool 6 is moved backward to the position of the origin 100 for the machine via instruction 201 of the program, as indicated by the arrow a in FIG. 25(b). Then, the chuck 4 of spindle 2 (head 2) is opened by instruction 202, and the rotation of spindle 1 is stopped via instruction 203. Spindle 2 is moved in the direction indicated by the arrow b by instructions 204 and 205 to a point where the chuck 4 can engage the work when closed. Chuck 4 of spindle 2 is then closed as indicated by arrow c, while chuck 3 of spindle 1 is opened as indicated by arrow d. Work 1 is thus transferred from spindle 1 to spindle 2 by instruction 206. Finally, spindle 2 is made to move, while gripping the work 10, by instruction 207, as indicated by the arrow e in FIG. 25(c). Thus, the transfer is completed, and it is now possible to machine the work on spindle 2.

As described above, in the machining process using the prior art lathe having two spindles, the system resembles two interconnected lathes, each having one spindle, such that the heads need respective machining programs 101 and 102. Further, in order to transfer the work between the spindles, extra programs 103 and 104 are required for the transfer. Furthermore, it is difficult to transfer the work with the correct timing because the motions at the two heads must be coordinated to effect the transfer. Additionally, programs 103 and 104 for the transfer are not realized through automatic programming but rely directly on EIA programs as shown in FIG. 24.

The aforementioned reference discloses a numerical control method which permits machining programs to be stored for each head. In this method, the overall program is stored in two blocks of one memory. When the work is to be machined by head 1, the memory block corresponding to the machining to be run on head 1 is called. When the work is to be machined by head 2, the program stored in the other memory block is called, and machining processes are executed at head 2. Separate programs are necessary for each head or each spindle.

PROBLEM TO BE SOLVED BY THE INVENTION

With the prior art automatic programming apparatus constructed as described above, each spindle requires its own program when the work is machined using two spindles and when the work is transferred from one spindle to the other. Also, a separate program is necessary for the transfer. Because the transfer program is not an automatic program, the machining process must be executed using an EIA program (or manually). Accordingly, conventional programs used in two spindle machining are difficult to understand. It takes substantial time to prepare such programs, and they are complex. Consequently, errors are likely and the programs lack accuracy.

SUMMARY OF THE INVENTION

The present invention solves the foregoing problems, and has as its object the provision of an automatic programming apparatus which provides numerical control and permits a work to be machined on two spindles and to be transferred between spindles using only one automatic program.

The novel automatic programming apparatus is used with a numerically controlled machine having a plurality of spindles. A two-spindle process is added to the programming scheme in addition to the known prior art machining process, so that one program covers processes performed by both spindles, processes for transferring the work, as well as conventional machining processes. This process specifies the machining spindle when two spindles are used. When the work is transferred, the transfer operation is carried out according to the program's transfer process.

BRIEF DESCRIPTION OF THE DRAWINGS

FIG. 3 is a schematic diagram of the control system of an SP machine according to the invention;

FIG. 4 is a diagram illustrating the contents of a typical machining program according to the invention;

FIG. 5 is a flowchart illustrating the overall operation of one example of the invention;

FIG. 6 is a flowchart illustrating a process using two spindles in accordance with the invention;

FIG. 7 is a diagram illustrating an example of the FIG. 6 process using two spindles;

FIGS. 12 and 13 are diagrams illustrating an example of the process in which a work is transferred;

FIG. 14 is a diagram concerning preparation data shown in FIGS. 12 and 13;

FIG. 15 is a diagram illustrating one example of a program used in the invention;

DETAILED DESCRIPTION OF THE PREFERRED EMBODIMENTS

In accordance with the invention, the process using two spindles is conducted by creating the correct conditions for the spindle to be subsequently used for the machining. The work can be machined using two spindles without the programmer being conscious of switching from one spindle to another when ordinary machining processes are conducted.

In the process for a transfer, a transfer control medium which forms the input of the NC machine is output in response to the minimum data necessary for the transfer.

Figure 1:
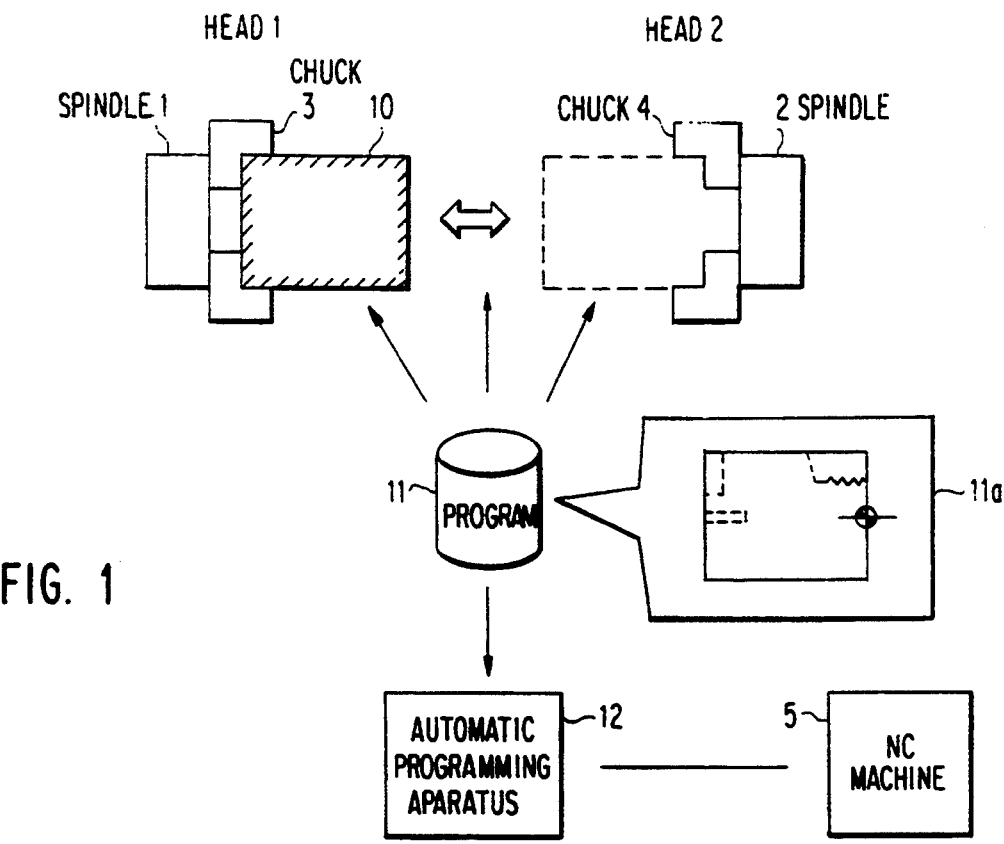
FIG. 1 is a schematic diagram illustrating the flow of a processing system according to the invention.

An example of the invention will be described hereinafter with reference to the drawings. FIG. 1 is a diagram illustrating the flow of the processing performed by an NC automatic programming apparatus fabricated in accordance with the invention. An automatic program 11 includes a process using two spindles and a process for transfers. The automatic programming apparatus for providing numerical control, indicated by 12, analyzes this automatic program 11 and delivers control media to an NC machine 5. One example of the contents of the automatic program 11 (a diagram of the workpiece as machined, and the workpiece origin) is indicated by 11a.

Figure 2:
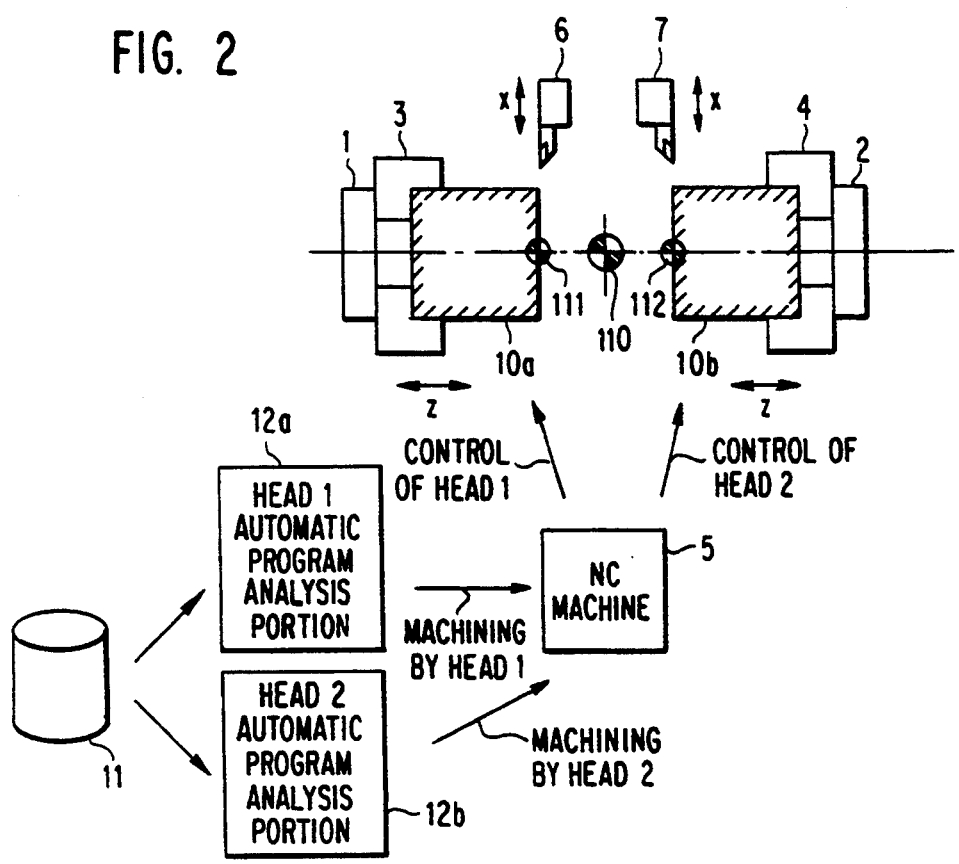
FIG. 2 is a schematic diagram showing the control system of an MP machine according to the invention.

FIG. 2 is a view similar to FIG. 1, but it is viewed from the control system context. In this figure, automatic programming apparatuses 12a and 12b exist for heads 1 and 2, respectively. FIG. 3 is a modification of FIG. 2, and in which the two heads are controlled by only one automatic programming apparatus 12.

In accordance with the invention, a machining program 11 is entered, using the coordinate system for either spindle 1 (head 1) or spindle 2 (head 2). An example of this is the program 11a diagrammatically shown in FIG. 1. The automatic programming apparatus 12 analyzes the program 11a and delivers a signal indicating a machining process which uses two spindles or a transfer of the work to the NC machine 5.

Machines having two spindles and control systems are classified into two major categories: MP machines (of the type shown in FIG. 2) having two tool turrets 6, 7 and two automatic programming apparatuses 12a and 12b for providing independent control; and SP machines (of the type shown in FIG. 3) having one tool turret 14 and one automatic programming apparatus 12.

In some coordinate systems, the origins 111 and 112 for the coordinates of the workpieces are located toward the end surfaces of the two heads, i.e., at the outward ends of the works (c.f. FIG. 2). In other coordinate systems, the origin 113 for the coordinates of the work located on the second spindle is located on the side of the workpiece facing the chuck 4. In any case, all the control media sent to the automatic programming apparatus and to the NC machine 5 are represented in terms of the coordinates of the work. Since the positions of the origins 111, 112, 113 for the work coordinate systems differ among the works 10 and for the spindles 1, 2, the position coordinates are given to each individual work from a reference work origin 110, which is given in terms of parameters from a machine origin 100.

The operation of the apparatus will now be described. Examples of the structure of program 11 covering a machining process using two spindles and transfer operations are shown in FIG. 4. The flow of processing is illustrated in FIG. 5. The machining process using two spindles is indicated by SEP. The transfer process is indicated by TRS.

When the automatic programming apparatus 12 is activated, it inputs one (initially, the first) process (instruction) from the program 11 (step 15). In the case of the new SEP process provided by the invention (step 16), the processing necessary for switching the spindle is performed (step 17). In the case of a TRS process (step 18), a signal indicating the need to transfer the work is produced (step 19). In the case of other conventional processes, e.g., machining of a rod material, machining for forming grooves, thread cutting, etc., a tool path is extracted in a conventional manner (step 20). This process continues in loop fashion (steps 21, 22) until all movement data for successive blocks has been delivered, and the processing of the current process is completed. Subsequent processes of the program 11 are successively treated in this manner until the entire program has been processed (step 23).

Actual SEP processing using two spindles will now be described. FIG. 7 shows one example of an SEP process using two spindles. SEP process 31 may be of one of three types. The first type involves a pattern 32 in which both heads are made to interlock with each other. The second type involves, a so-called "cross" pattern 33 where the work may be machined using the spindle of the specified head and the tool of the non-specified head. In the third type or "independent" pattern 34, the work is machined with one specified head. In each case, the head used to machine the work is specified (see HEAD entry 35). The machining performed subsequent to the SEP process is conducted with the head specified at 35 until the next SEP process 31 occurs. It is to be noted that cross pattern 33 cannot be executed with the construction of FIG. 3 having only one tool turret.

Figures 8, 9:
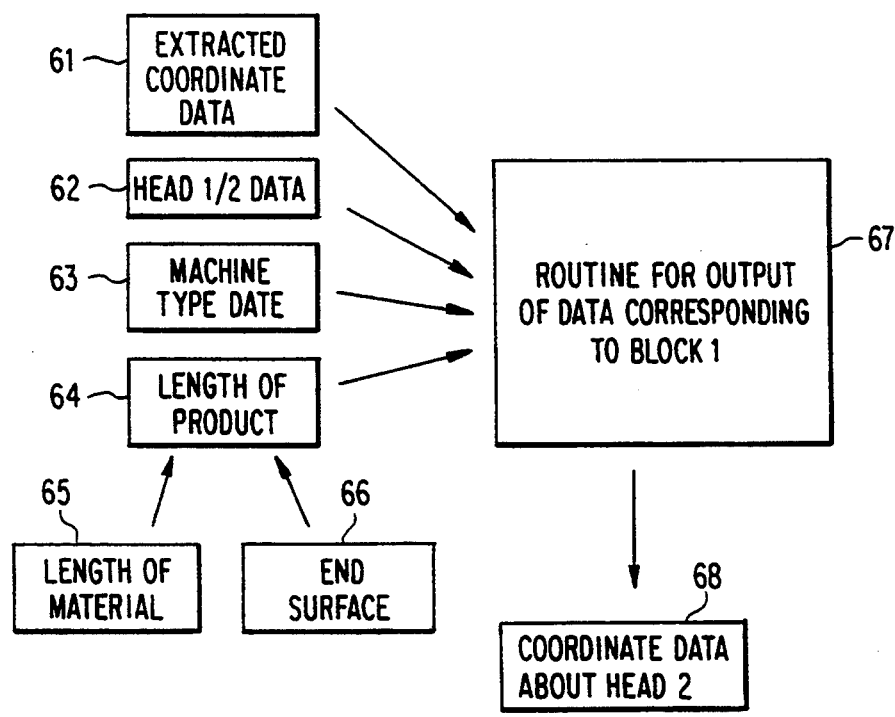
FIG. 8 is a diagram illustrating an example of different patterns of the two-spindle process.
FIGS. 9 and 10 are diagrams illustrating the method of transforming the coordinates of the output data.

When there are automatic programming apparatus 12a and 12b for the respective heads as shown in FIG. 2, i.e., in an MP machine, control is provided in the SEP process 31 in the manner described below. In this construction, first a process is read from the machining program 11. With conventional processes excluding TRS and SEP processes, only the portion for head 1 is read and analyzed by the automatic programming apparatus 12a for head 1, and only that portion relating to head 2 is read and analyzed by the automatic programming apparatus 12b for head 2. The distribution of work to the two heads according to source program 11S (FIG. 4) is determined by the HEAD entry 35 in SEP process 31. Thus, the source program 11S is divided into program 11A for head 1 and program 11B for head 2. This permits the work to be machined using two heads when automatic programming apparatuses 12a and 12b exist for each head. When the work is transferred, the apparatus waits for a time corresponding to one operation to allow synchronization, since the two automatic programming apparatuses are independent. At the beginning of the processing of SEP process 31, queuing is done at the time of either interlocking or cross operations 32, 22 to synchronize the heads. For queuing, the OS command "task wait" is used. When the heads are successfully synchronized, the NC machine 5 activates them. For processing the SEP process 31, codes as shown in FIG. 8 are delivered to the NC machine 5 according to the present and subsequent patterns of operation. FIG. 8 shows one example.

When an interlocking operation is to be performed (37, 42) after an independent operation 34 or a cross operation 33, a signal (code) M511 for starting interlocking is produced. When a cross operation 33 is to be started (38,40) after an independent operation 34 or, an interlocking operation 32, a signal M544 for starting the cross operation is delivered. When independent operations 34 are to be performed (39) after an interlocking operation 32 is performed, interlocking is canceled (M512). When an independent operation is to be performed (34) after a cross operation 33 (41), a signal indicating cancellation of the cross operation is produced (M545). This will now be described by referring to the flowcharts of FIGS. 5 and 6. In the processing of the SEP process in step 17 of FIG. 5, the apparatus performs a waiting step when interlocking or cross operations are to be performed (step 25). An operation code is then delivered according to the present machining pattern (independent, interlocking, or cross operations) and the specified pattern (step 28), per FIG. 8.

The SP machine operates with a single automatic programming apparatus as shown in FIG. 3. In the case of the SP machine, operation proceeds in the manner described below.

In the SP machine, both spindles 1 and 2 are controlled by one automatic programming apparatus 12. Therefore, when the machining program 11 is being read (step 15 in FIG. 5), the program is not distributed (per FIG. 4) as in the MP machine shown in FIG. 2. The contents 11S of the source program are all executed. If an SEP process 31 for using two spindles occurs (step 17), and if the spindle different from the current spindle is to be employed for machining purposes, data, such as parameters, are modified for the different head to which the automatic programming apparatus refers (step 26). A signal indicating a change in the controlled head is produced and directed to the NC machine 5 (step 27). A signal indicating a change in the operation pattern is delivered (as shown in FIG. 8) in the same manner as in the MP machine (step 28). In this case, no cross pattern (33) exists, since only one turret exists.

The processing of the output considering the coordinate system in use is now described. In the workpiece coordinate system, coordinate value Z decreases in the direction from the origins 111, 112,113 toward the work 10. Since the positions of the work origins 111,112, 113 with respect to the work reference origin 110 are stored in separate memories, the positions of the work origins 111, 112, 113 do not change for the same given work 10 unless an operation for transferring the work is performed. If the automatic programming apparatus 12 (or 12a, 12b) deliver control media in any work coordinate system, the position in the work reference coordinate system (in a broader sense, the position in the coordinate system for the machine) can be calculated within the NC machine 5.

Because the machining program 11 is described in terms of a work coordinate system (for example, using the work coordinate origin seen in 11a in FIG. 1) in the head 1, the output data from the automatic programming apparatus produced when the work is to be machined by the head 2 does not need to be transformed provided that the coordinate system for the head 1 is shifted and treated as the coordinate system for the head 2 as is possible in FIG. 3. However, if the coordinate systems for the heads 2 and 1, respectively, are directed oppositely such that the workpiece origins 111, 112 are located on opposite sides of the work 10 when the work is located on different spindles, as shown in FIG. 2, it is necessary to transform the z coordinates of the output data processed by the head 2 into the coordinate system for the head 2.

In each machining process, when data is output (step 21, FIG. 5) by data output routine 67 as shown in FIG. 9, the type of coordinate system arrangement being used is known from data 62, which gives information about the head presently in use, and from data 63 which indicates whether the machine is of the type shown in FIGS. 2 or 3. Therefore, the coordinate data 61 extracted in each process can be transformed (as needed) and output (68).

Figure 10:
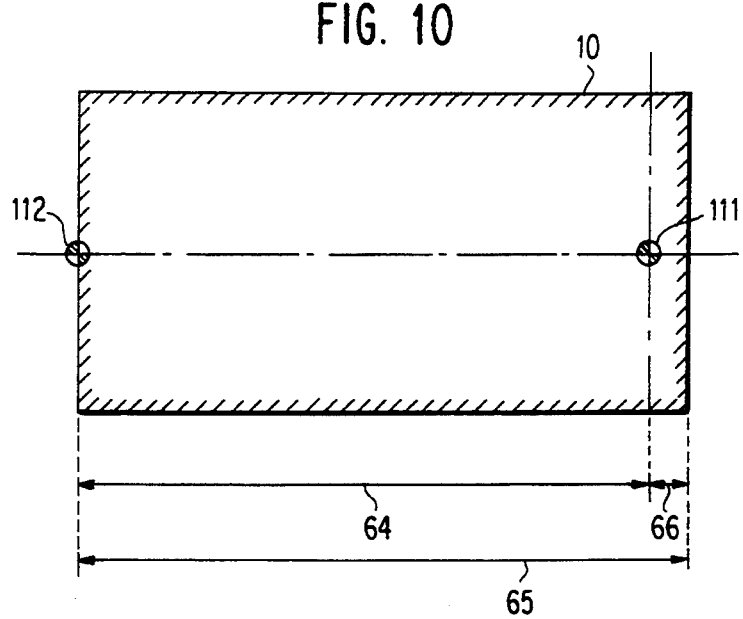

FIG. 10 shows one example of the method of transforming between coordinate systems. In FIG. 10, the coordinate systems for both heads are drawn about the work 10. Each coordinate can be transformed by knowing the distance between the origin 111 for the head 1 and the origin 112 for the head 2, i.e., the product length 64. Thus, (z coordinate of head 2)= −(length 64)+z coordinate of head 1)

It is not necessary to transform x coordinates. The length of the product 64 can also be calculated from the length of the work 65 before machining, or the length of the material, and from the length of the protruded end surface 66 which exists outside the finished product and which is to be machined off and the surface made smooth. Protruded end surfaces may exist on both sides of the work 10. Thus, (length of the product)=(length of the material)−(length of the protruded end surface)

In this way, a program is read (step 15), the SEP process 31 is executed (step 17), and data on one block at a time is delivered (step 21). Hence, the work can be machined using two heads.

The processing for a transfer (TRS) will now be described. When a machining program is being executed, if the process for a transfer (TRS) is reached, control data necessary for the transfer of the work is selected from the data in the process and from associated data and delivered to the NC machine 5 (step 19).

Figure 11:
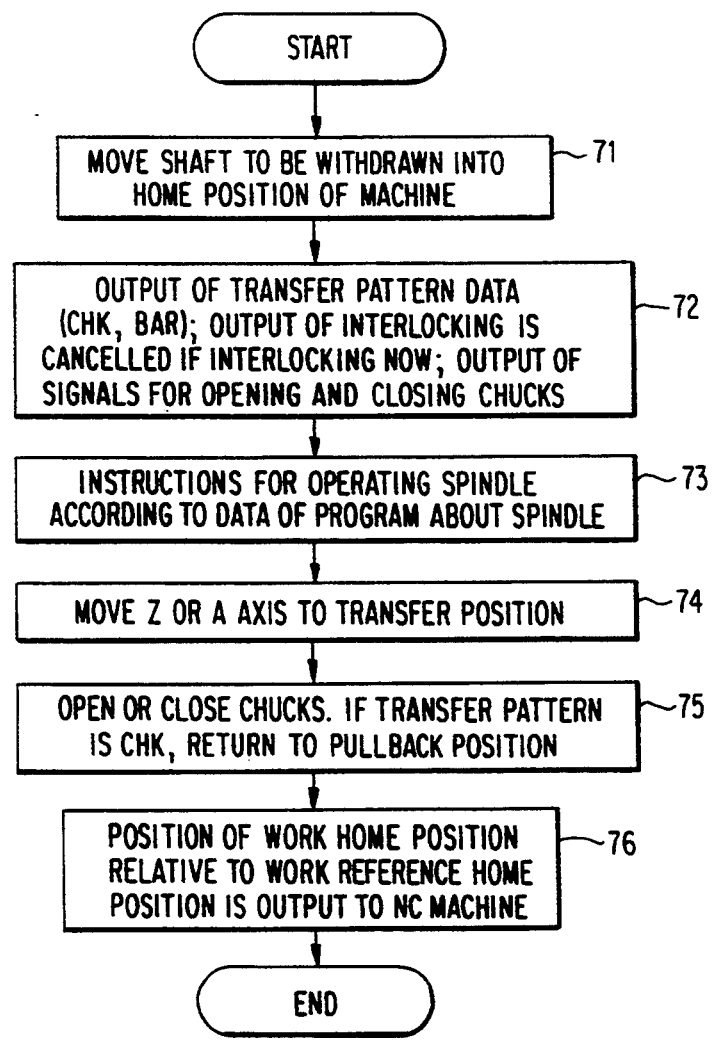
FIG. 11 is a flowchart illustrating the operation of transferring a work.

FIG. 11 is a flowchart illustrating processing of a transfer. FIGS. 12 and 13 show examples of the transfer (TRS). In the set of information shown in these figures, TRS (77) indicates a transfer process. CHK (78) indicates an actual transfer of the work 10 between spindles 1 and 2. BAR (83) indicates that there will be a movement or relocation of the position(s) at which the work 10 is gripped by the chucks 3 and 4. The preparation number (79) indicates such items as the position at which the work is transferred, relief positions, and the position that the origin of the coordinates of the work assumes after the transfer. This data is arrayed and stored in a separate memory. HEAD (80) indicates the direction in which the work is transferred (in the case of a CHK type transfer) or data on which head will have its chuck relocated. Spindle entry 81 gives data on the spindle when the work is transferred, i.e., whether the spindle should be stopped, oriented at a particular rotational angle, etc. Push entry 82 indicates whether the work 10 should be advanced by a given amount when a workpiece is transferred. Chuck 85 indicates whether the transferring chuck should be opened after the work 10 is gripped by the other chuck.

The operation performed for the TRS process will be described with reference to FIG. 11. First, processing for the TRS process (step 19 in FIG. 5) is performed. Then, the x axis is moved to the origin of the machine to prevent the turret or tool from colliding with the work 10 or another component (step 71).

Then, the type (CHK or BAR) of the transfer is indicated to the NC machine 5. If the heads are presently interlocking, then they are de-interlocked. Signals instructing the chucks 3 and 4 to open or close are produced (step 72). In response to the data 81 on the spindle, an instruction for, e.g., rotating the spindle is issued (step 73). The spindle 1 (or 2) is moved to the position where a transfer can be performed (step 74). The amount of this movement is determined in response to the preparation number 79 contained in the program, by referring to the corresponding data stored in a separate memory.

FIG. 14 shows one example of this data. Each set of data consists of transfer position data, relief position data, and the position, or z offset, of the origin for the work after the transfer. Numerous sets of this data are arrayed as indicated by examples 86a, 86b, 86c. The preparation number 79 specified in, for example, TRS process 77, determines which data set is to be selected. The spindle is then moved according to the selected data. If the transfer pattern is CHK, the spindle is returned to the return position, or the relief position for preparation (step 75). Finally, the position of the origin for the work relative to the work reference origin, or z offset, is delivered to the NC machine (step 76).

These operations will now be described in connection with the specific case of the SP machine shown in FIG. 3. A CHK type will be used as an example. In FIG. 15, numeral 88 indicates the instructed transfer process, the process being contained in the machining program.

Figure 16:
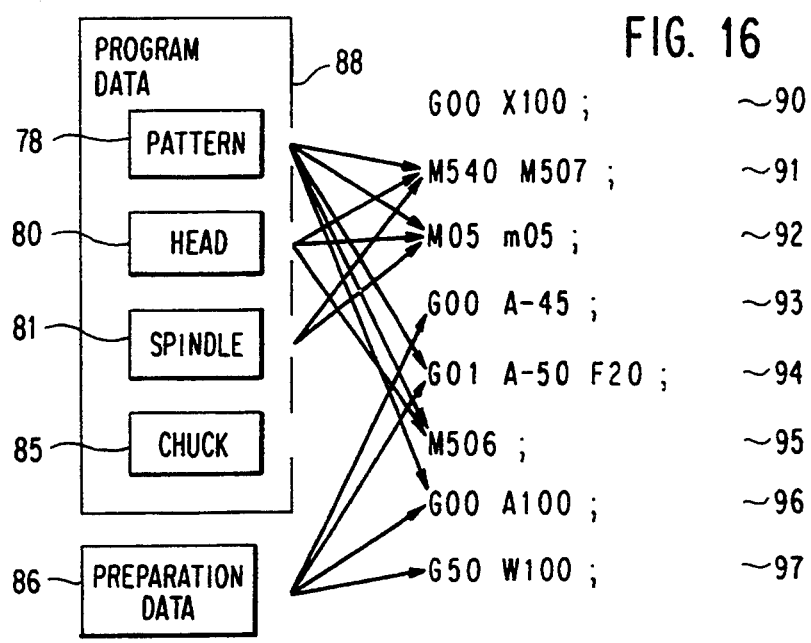
FIG. 16 is a diagram illustrating output data of the program illustrated in FIG. 15.
Figure 19:
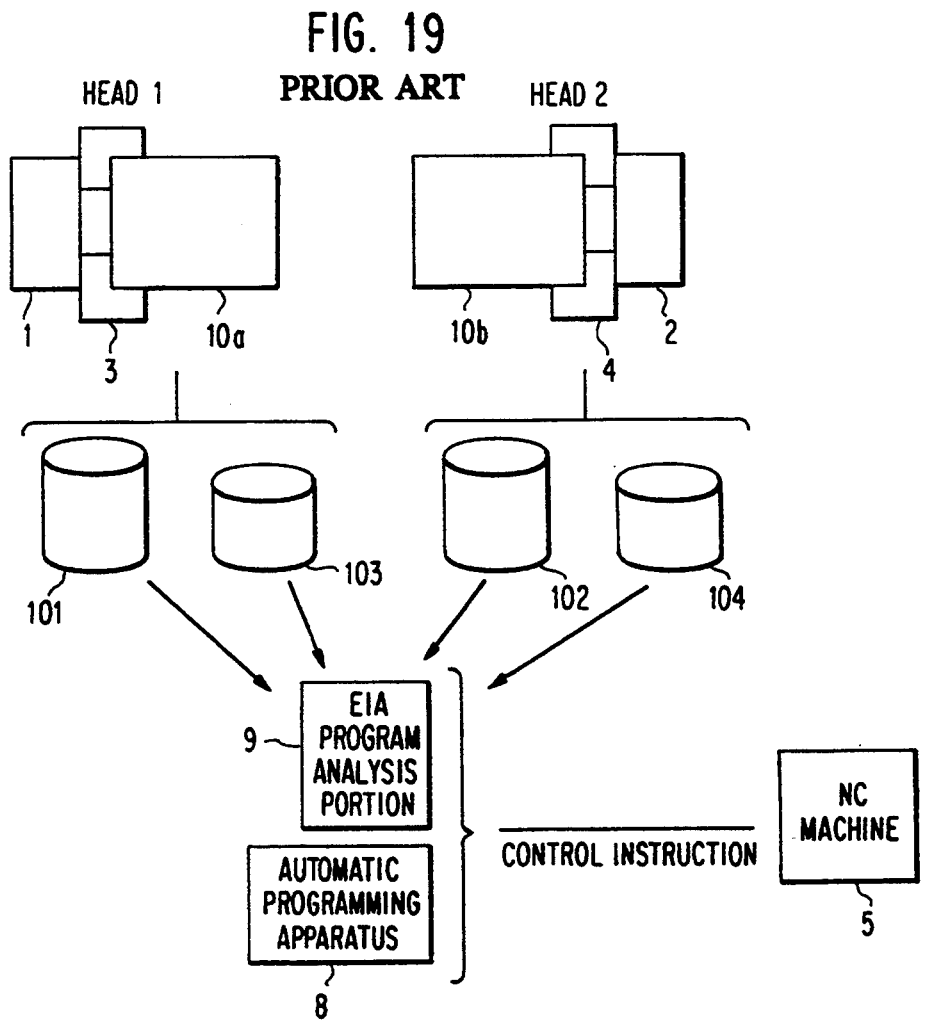
FIG. 19 is a diagram illustrating the control operation of the prior art automatic programming apparatus.
Figure 17A:
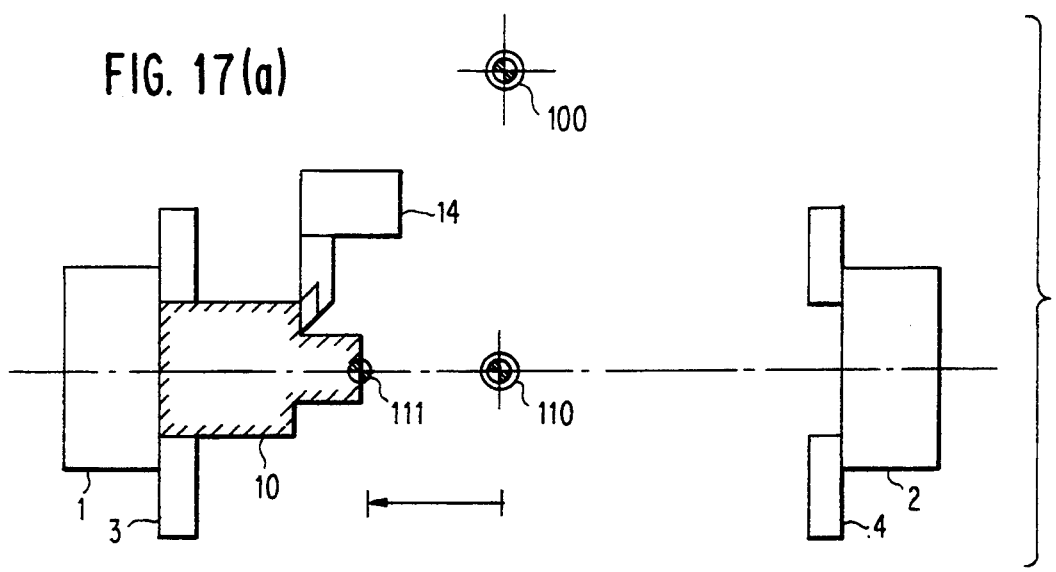
FIGS. 17(a)–17(c) are diagrams illustrating operations according to the program illustrated in FIG. 15.
Figure 17B:
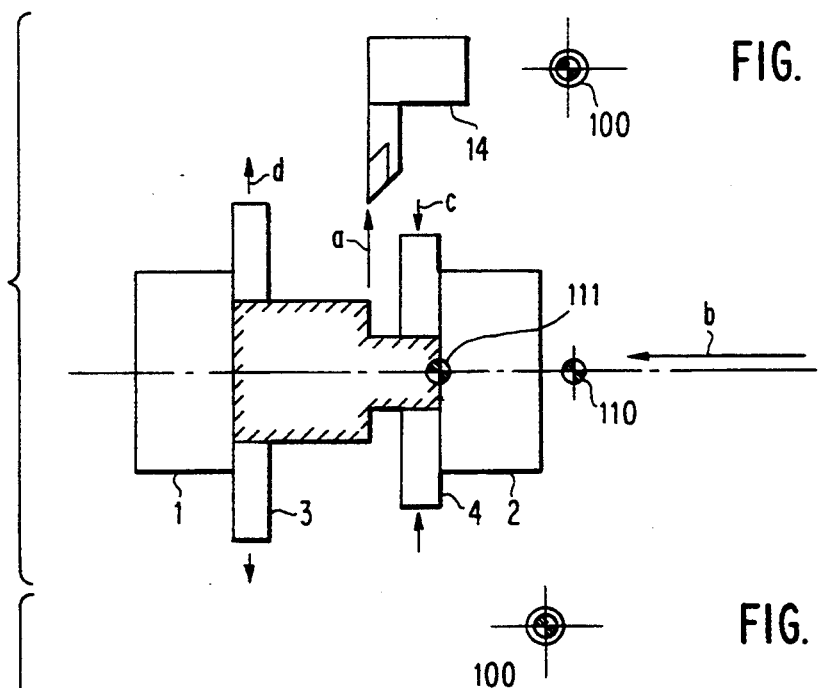
Figure 17C:
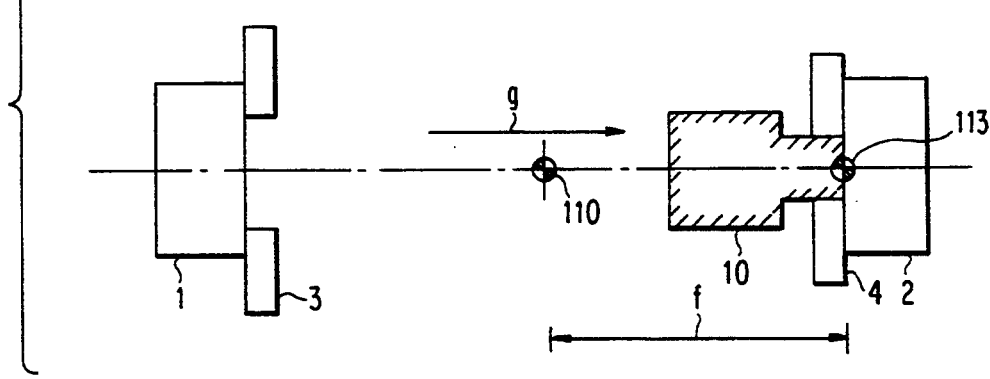
Figure 18A:
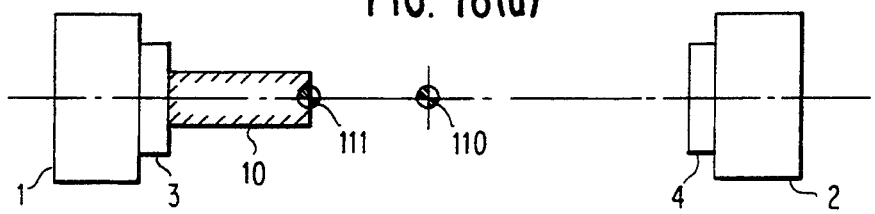
FIGS. 18(a)–18(e) are diagrams illustrating operations in another example of machining according to the invention.
Figure 18B:
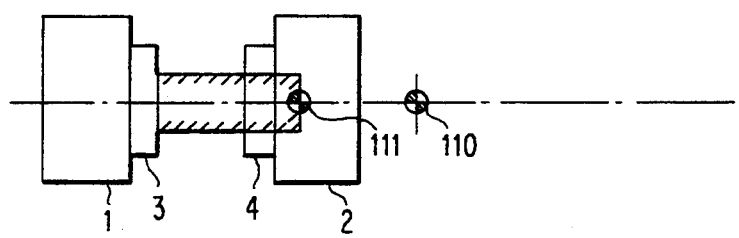
Figure 18C:
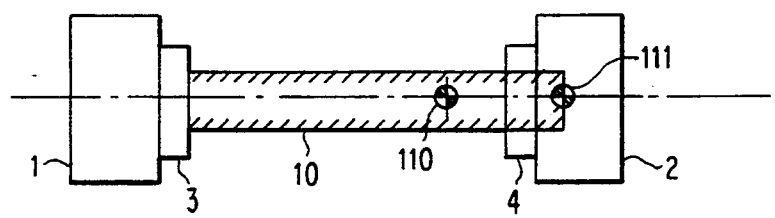
Figure 18D:
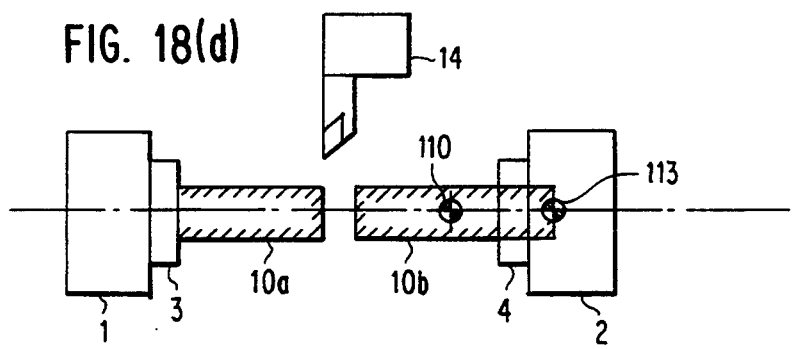
Figure 18E:
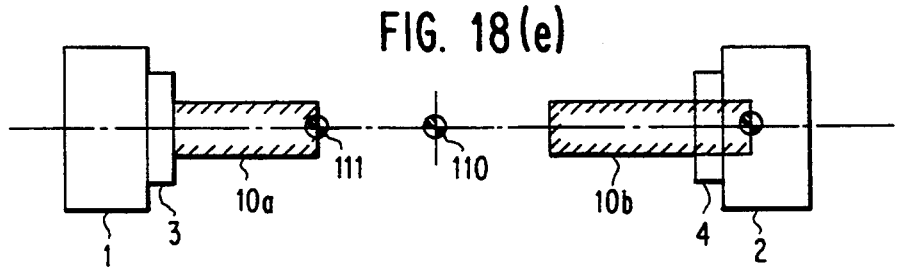
Figure 20:
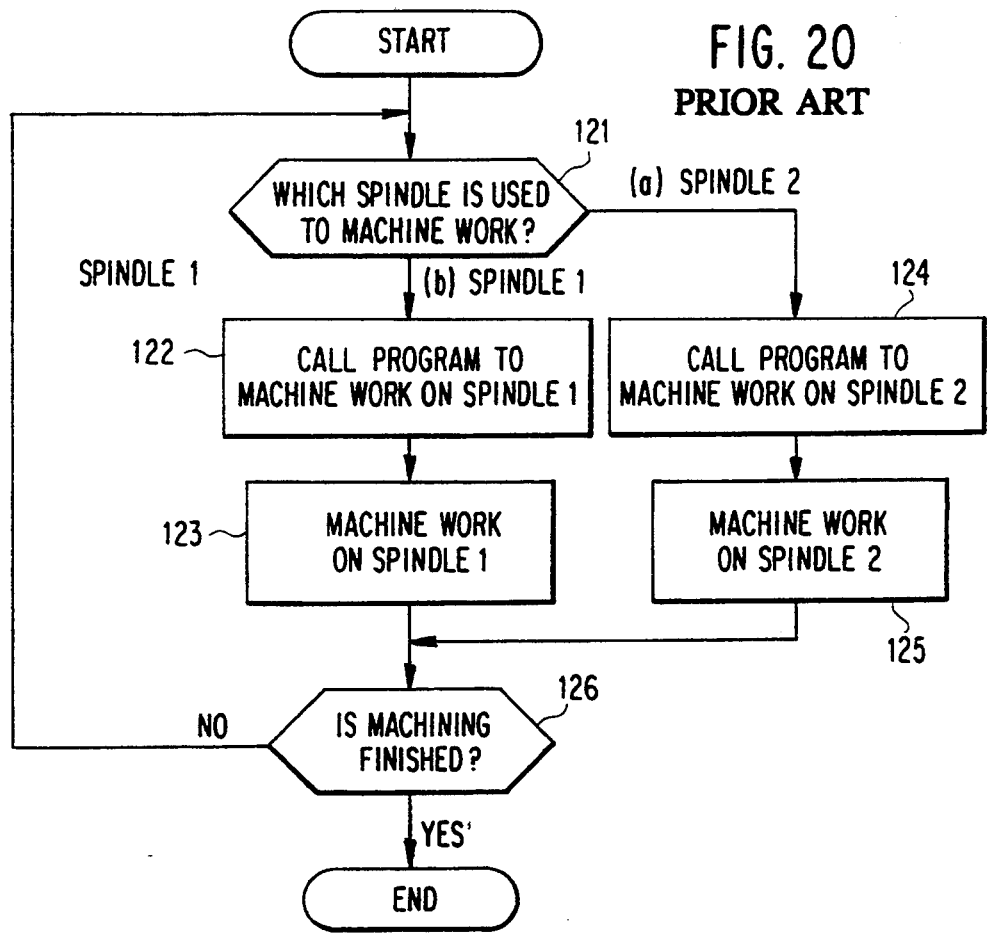
FIG. 20 is a flowchart illustrating the prior art process using two spindles.
Figure 21:
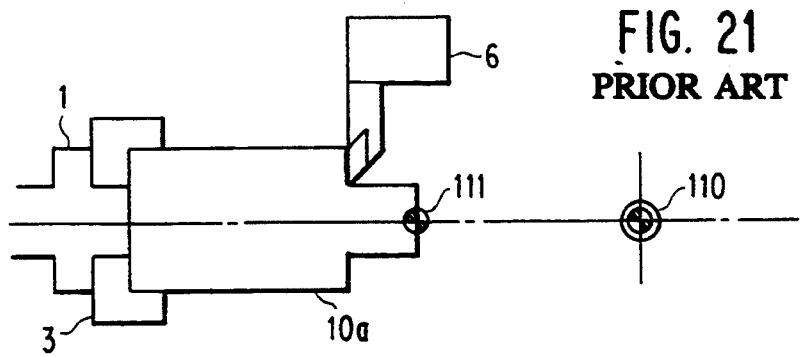
FIGS. 21 and 22 are diagrams illustrating prior art machining using two spindles.
Figure 22:
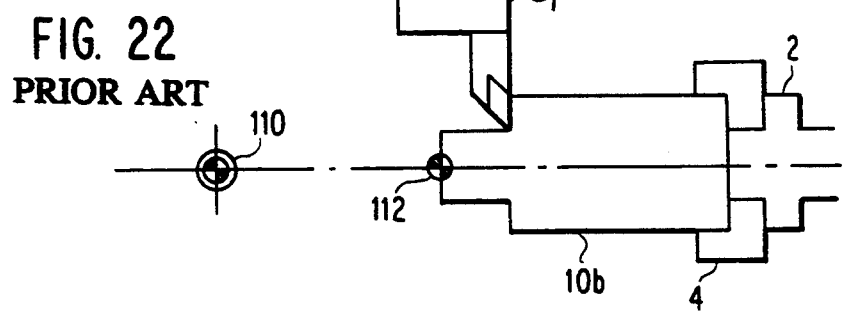
Figure 23:
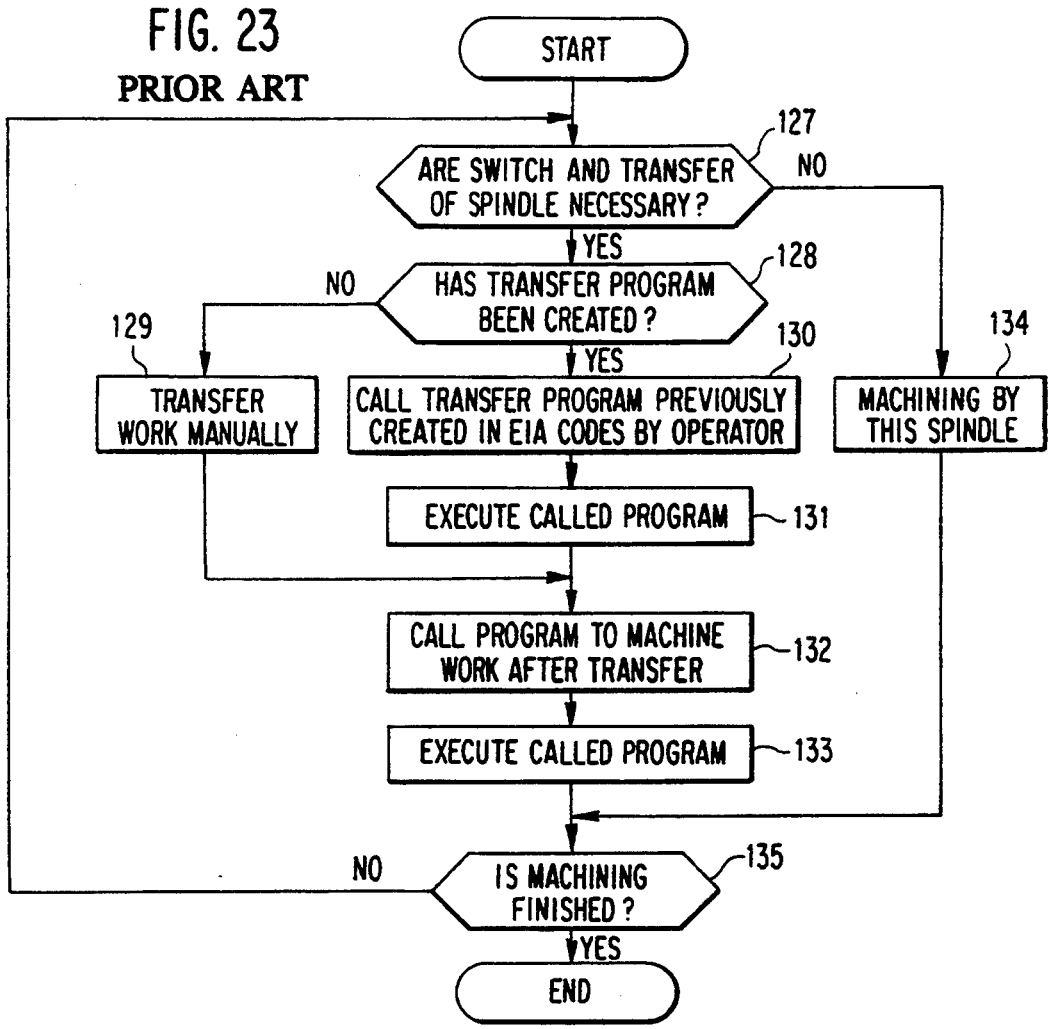
FIG. 23 is a flowchart illustrating the prior art operation for a transfer.
Figure 24:
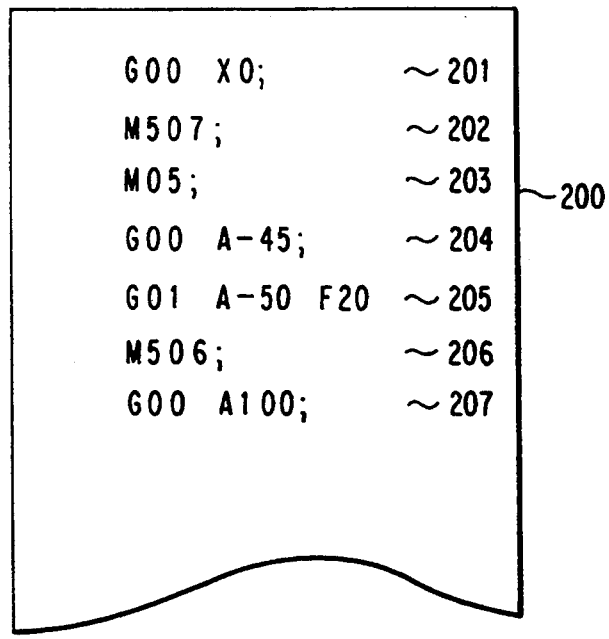
FIG. 24 is a diagram illustrating the manner in which the prior art operation is performed with an EIA program.
Figure 25A:
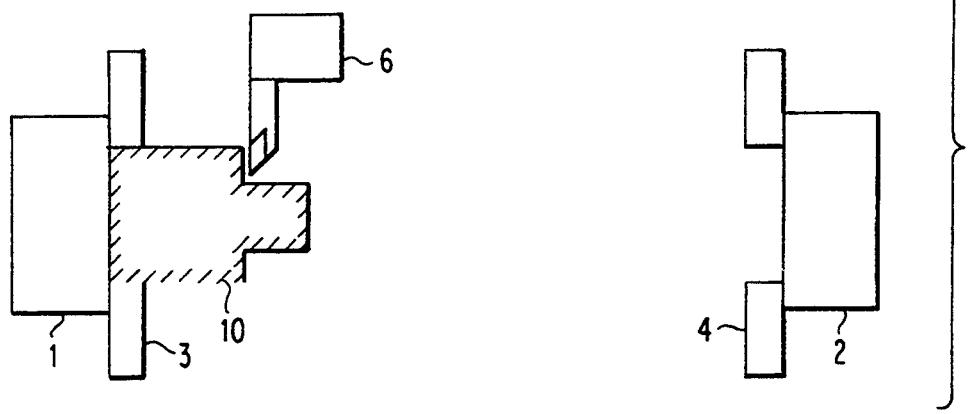
FIGS. 25(a)–25(c) are diagrams illustrating the operations performed according to the EIA program.
Figure 25B:
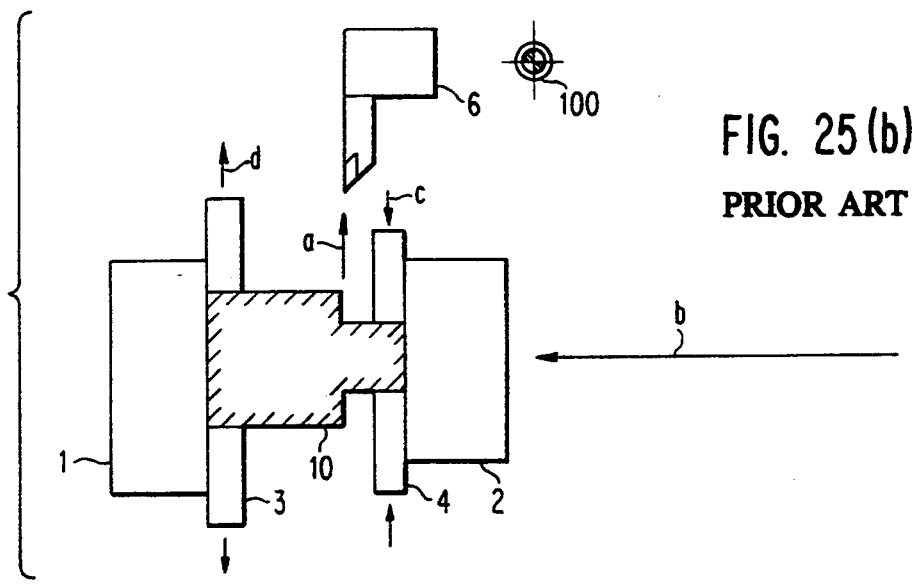
Figure 25C:
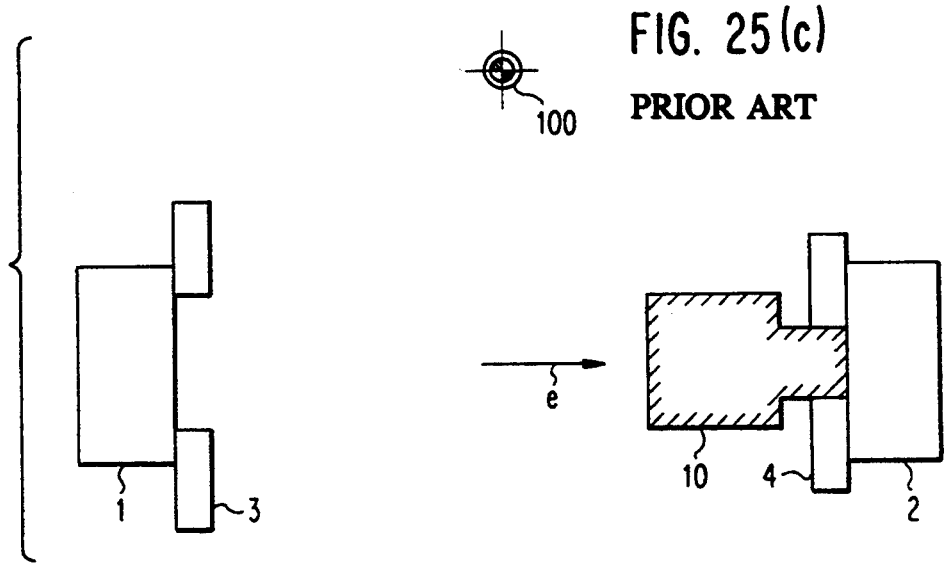

Indicated by 86 is any one of data sets 86a, 86b, 86c, etc. (as specified by the preparation number container in the program (not shown in FIG. 15.)) shown in FIG. 14. An example of the output is shown in FIG. 16, where the arrows indicate data items taken into account in deriving the various instructions shown at right. An example of the operation is shown in FIG. 17.

Before the work is transferred, the work 10 is being machined by the spindle 1, on the head 1. When the process for transfer (TRS) should be executed, block 90 (FIG. 16) is output to move the tool 14 to the position of the machine origin as indicated by the arrow in FIG. 17(b). Then, the pattern of the transfer is selected from the pattern data 78 included in the instruction 88. Block 91 for opening and closing the chucks is delivered according to head data 80 and the spindle data 81. In this example, the CHK pattern is indicated by M540. The chuck 3 is closed and the chuck 4 is opened by M507. Signals indicating rotation (or stoppage or positioning) of the spindles 1 and 2 are delivered by block 92. Thereafter, blocks 93 and 94 are delivered to move the spindle 2 to the transfer position specified by the data 86 (the preparation data corresponding to the preparation number specified in the process) as indicated by in FIG. 17(b) arrow b. In this case, the spindle is moved at a high speed (G00 indicates rapid movement) to a given position by block 94. The chuck 4 is closed and chuck 3 is opened by block 95, as indicated by arrows c and d in FIG. 17(b). Block 96 is prepared from the relief position data contained in preparation data 86. The spindle 2 is moved as indicated by the arrow g (FIG. 17(c)). Finally, in order to machine the work 10 using spindle 2, block 97 giving the position f, or z offset, of the new origin 113 for the work with respect to the reference work origin 110 is delivered.

The order in which the operations for the transfer are performed is controlled, using the minimum required program data. As a result, a long bar can be measured and machined as shown in FIG. 18 (a)–(e) through the transfer process. The work 10 here takes the form of a long bar (rod) which is pulled out through the spindle 1.

Here, after machining using the spindle 1, the spindle 2 is moved, using the TRS-BAR instruction (83). The work 10 can be machined while gripping (chucking) both ends, because in the BAR (83) type operation, the return-to-origin operation (step 75) illustrated in FIG. 11 is not performed.

Then, the spindle 2 is pulled back to pull out the work 10. The work 10 is machined using the tool 14. In this state, the work can be machined on spindles 1 and 2.

The above-described movement of the spindles and the control of the operation of the chucks are permitted by the transfer process.

In the above example, when the work is machined using 2 spindles, the program 11 is based on head 1. The program can also be based on head 2 with a minor interchange of program content.

In the operation for a transfer, the work is typically transferred from head 1 to head 2, but the reverse situation can be treated similarly. In the above example, an SP machine has been described. The invention can be applied with equal utility to an MP machine.

In accordance with the invention, a process in which the work is machined using two spindles and a transfer process by which the work is transferred between spindles are added to the automatic programming scheme. Therefore, machining the work using two spindles and transferring the work are enabled with a straightforward input that can be easily understood and through the use of a single program. Furthermore, conventional machining can be effected without the programmer having to be constantly conscious of which head is being employed. In addition, the operation is continuous and accurate.

I claim:

1. An automatic programming system for a lathe having a plurality of spindles, comprising:
   means for providing a single program which includes machining processes to be carried out on separate spindles, and a transfer process for transferring a workpiece from one spindle to another; and
   conversion means for moving a home position of said workpiece to a position distant from an initial home position thereof, based on information as to a length of said workpiece and a distance between chucks of said spindles, and for converting at least a part of said program into program data having a new home reference position.

2. An automatic programming system for a lathe according to claim 1, wherein said conversion means further comprises means for transforming coordinates of a coordinate system associated with one of said plurality of spindles into coordinates of an oppositely directed coordinate system associated with another one of said plurality of spindles.

3. An automatic programming system for a lathe as recited in claim 1, wherein the new home reference serves as a reference for each of the plurality of spindles.

* * * * *